(12) United States Patent
Vercammen et al.

(10) Patent No.: US 12,251,650 B2
(45) Date of Patent: Mar. 18, 2025

(54) FILTER ELEMENT WITH KEYED SPINNING THREAD-ON ATTACHMENT

(71) Applicant: Parker-Hannifin Corporation, Cleveland, OH (US)

(72) Inventors: Michael P. Vercammen, Turlock, CA (US); Kevin B. Downs, Coventry, CT (US); Rajeswara R. Kurri, Collierville, TN (US)

(73) Assignee: Parker-Hannifin Corporation, Cleveland, OH (US)

( * ) Notice: Subject to any disclaimer, the term of this patent is extended or adjusted under 35 U.S.C. 154(b) by 0 days.

(21) Appl. No.: 18/603,389

(22) Filed: Mar. 13, 2024

(65) Prior Publication Data

US 2024/0226777 A1    Jul. 11, 2024

Related U.S. Application Data (63) Continuation of application No. PCT/US2022/045221, filed on Sep. 29, 2022.

(60) Provisional application No. 63/271,142, filed on Oct. 23, 2021, provisional application No. 63/250,390, filed on Sep. 30, 2021.

(51) Int. Cl.
    *B01D 27/08*    (2006.01)

(52) U.S. Cl.
    CPC ...... *B01D 27/08* (2013.01); *B01D 2201/4007* (2013.01); *B01D 2201/4023* (2013.01); *B01D 2201/4053* (2013.01)

(58) Field of Classification Search
    CPC ............ B01D 27/08; B01D 2201/4007; B01D 2201/4023; B01D 2201/4053

USPC ......... 210/348, 405, 440–444, DIG. 17, 455, 210/456, 213, 214

See application file for complete search history.

(56) References Cited

U.S. PATENT DOCUMENTS

| | | | |
|---|---|---|---|
| 6,287,464 B1 * | 9/2001 | Gu | B01D 29/21 210/232 |
| 6,349,836 B1 | 2/2002 | Langsdorf et al. | |
| 9,132,367 B2 | 9/2015 | Honermann et al. | |
| 10,092,868 B2 | 10/2018 | Honermann et al. | |

(Continued)

FOREIGN PATENT DOCUMENTS

| | | |
|---|---|---|
| EP | 0830885 A1 | 3/1998 |
| EP | 2764901 A1 | 8/2014 |

(Continued)

*Primary Examiner* — Madeline Gonzalez
(74) *Attorney, Agent, or Firm* — Reinhart Boerner Van Deuren P.C.

(57) ABSTRACT

A filter element including a canister, media, and a spinning disc element is provided. The canister circumscribes a central axis. A tap plate is at an end of the canister having a central threaded opening along the central axis of the canister. The tap plate includes a first outer opening radially spaced between the central opening and a periphery of the tap plate. The disc element is supported for rotation on the tap plate. A first keyed protrusion projects outwardly from the disc element. The keyed protrusion defines a first flow opening. The spinning disc element is rotatable about the central axis. The first outer opening is in fluid communication with the first opening of the first keyed protrusion such that fluid can into or out of the canister. Filter systems including a filter head to which the filter element may be mounted are also provided.

25 Claims, 10 Drawing Sheets

(56) References Cited

U.S. PATENT DOCUMENTS

| | | |
|---|---|---|
| 10,583,375 B2 | 3/2020 | Jokschas et al. |
| 2013/0313179 A1 | 11/2013 | Kocksch |
| 2018/0257005 A1 | 9/2018 | Johnson et al. |

FOREIGN PATENT DOCUMENTS

| | | |
|---|---|---|
| EP | 3228374 A1 | 10/2017 |
| JP | 53408672 B2 | 11/2013 |
| WO | WO 2008143930 A1 | 11/2008 |
| WO | WO 2014018825 A1 | 1/2014 |

* cited by examiner

FILTER ELEMENT WITH KEYED SPINNING THREAD-ON ATTACHMENT

CROSS-REFERENCE TO RELATED PATENT APPLICATIONS

This Patent Application is a continuation of U.S. PCT Application No. PCT/US2022/045221, filed Sep. 29, 2022, which is now pending and designates the United States. U.S. PCT Application No. PCT/US2022/045221 claims the benefit of U.S. Provisional Patent Application No. 63/271,142, filed Oct. 23, 2021. U.S. PCT Application No. PCT/US2022/045221 claims the benefit of U.S. Provisional Patent Application No. 63/250,390, filed Sep. 30, 2021. The entire teachings and disclosures of each are incorporated herein by reference thereto.

TECHNICAL FIELD

A spin-on cartridge filter product is provided. Fluids which can be filtered through the filter product include fuel, oil, coolant, and urea.

BACKGROUND

Many spin-on replacement filters attach to a filter head by means of a stationary threaded spud provided by the filter head.

It is often desired to provide keying between the filter head and the replacement filter elements to prevent or inhibit an incorrect filter element from being accidentally attached to the filter head. A filter element that is not properly designed for the particular system could result in damage to the filter system or downstream components that use the filter that has been filtered.

Further, in liquid filtration particularly, the fluid remaining in the system during maintenance can spill when the filter element is removed. This can cause a mess that increases the amount of time it takes to perform the maintenance activities or damage other components proximate the filter system.

SUMMARY

The subject filter product provides attachment of a filter element to a header using rotating (spinning) elements on the filter element and/or filter head. The product also minimizes spillage during servicing, that is, when the filter element is removed from the header when spent.

An exemplary feature of the product relates to a spinning disc element of the filter element that has at least one keyed protrusion, which preferably has a generally arcuate or pie shaped configuration and projects axially outward from the spinning disc element. The at least one keyed protrusion includes at least one opening that defines a flow path through a disc portion or frame portion of the spinning disc element. The spinning disc element surrounds a central annular threaded opening, typically provided by a tap plate, and is rotationally supported and retained proximate an end of the filter element between a tap plate and a retainer. The tap plate and retainer may be referred to as inner and outer plate members of a plate assembly or a tap plate assembly. The tap plate may have one or more flow openings that communicate with the opening(s) in the spinning disc element. A flow path is thereby defined through the openings in the keyed protrusions and through the openings in the tap plate underlying the spinning disc element, into the filter element.

Another feature is a header disc that is rotatably secured to the filter head. The header disc has a central threaded spud and openings that can receive the keyed protrusions of the filter element. The header disc will normally spin when a third-party filter element is attempted to be threaded onto the threaded spud. The spinning of the threaded spud prevents the third-party filter element from being installed on the filter head.

The keyed protrusions on the spinning disc element slide through the openings in the header disc and into the filter head when the filter element is assembled on the filter head. The filter head has positive stop features, e.g., alignment ribs, which when engaged (angularly) with the keyed protrusions, angularly lock the header spinning disc in place. When locked in place, the threaded spud on the header disc remains fixed relative to the filter head base and can engage the threaded opening in the filter element and allow the element to be threaded onto the filter head.

When the filter element is spent, the flow through the filter head is stopped, such as by turning a valve, and the filter element can be threaded off of the filter head. The openings in the keyed protrusions on the spinning disc element continue to direct any remaining fluid in the filter head into the filter element as the filter element is removed, thereby minimizing spillage. The keyed protrusions geometry and opening shapes can vary in shape, number, and orientation to fit wide range of configurations. The geometry of the openings and keyed protrusions can be predetermined to limit which filter elements may be used with the filter head.

In another example, a filter head with a fixed header disc can be provided that has an arcuate opening through the header disc. A flap may be mounted adjacent the opening and be selectively opened when the filter element is threaded onto the filter head. The flap may be attached to the header disc at one end and free at the other end. An abutment lip may be located proximate the end of the opening at which the free end of the flap is located.

A filter element having a ramped keyed protrusion can cooperate with the filter head. An elevated end of the ramp can abut the abutment lip to limit angular rotation of a spinning disc element of the filter element. Again, the keyed protrusion has an opening to permit fluid flow therethrough. When sufficiently threaded onto the threaded spud of the filter head, e.g. when the filter element is sealing seated against the base of the filter head, the flap is pushed away from the header disc unblocking the opening therein permitting fluid flow from between the filter head and filter element through the opening in the ramped keyed protrusion.

In some examples, when the filter element is removed, the flap will resilient flex back against an inner surface of the header disc sealing off the opening in the header disc reducing leakage and spillage at maintenance intervals.

In one example, a filter element including a canister, media, and a spinning disc element is provided. The canister circumscribes a central axis and includes a tap plate at an end of the canister. The tap plate includes a central threaded opening along the central axis of the canister. The tap plate includes a first outer opening radially spaced between the central opening and a periphery of the tap plate. The media is supported centrally within the canister. The spinning disc element is supported for rotation on the tap plate. A first keyed protrusion projects outwardly from the spinning disc element. The first keyed protrusion defines a first flow opening. The spinning disc element is rotatable about the central axis when under an external force. The first outer opening is in fluid communication with the first opening of the first keyed protrusion such that fluid can pass between the first opening of the first keyed protrusion and the first outer opening in the tap plate into or out of the canister.

In some embodiments, the external force is generated due to engagement with a filter head and torque applied to the cannister.

In one example, the first keyed protrusion forms an axial extent of the filter element. The first keyed protrusion defines a distal end that is positioned offset from the canister. This keyed protrusion can abut portions of the filter head.

In one example, a second keyed protrusion projects outwardly from the spinning disc element. The second keyed protrusion defines a second flow opening. The second flow opening is in fluid communication with the first flow opening and the first outer opening in a region formed between the tap plate and a body portion of the spinning disc element from which the first and second keyed protrusions project.

In one example, an annular filter head seal circumscribes the spinning disc element.

In one example, a greater amount of torque is required to rotate the tap plate relative to the cannister than to rotate the spinning disc element relative to the tap plate such that torque applied to the cannister is transferred to the spinning disc element to rotate the spinning disc element relative to the tap plate rather than to rotate the tap plate relative to the canister.

In one example, the spinning disc element is axially biased against the tap plate.

In one example, the spinning disc element has a central opening that circumscribes the central threaded opening of the tap plate.

In one example, the body portion of the spinning disc element is generally annular with an imperforate region extending angularly between the first and second keyed protrusions. The body portion defines a central opening that circumscribes the central threaded opening of the tap plate. The first and second openings open angularly about the axis such that fluid flow into or out of the first and second openings is in an angular orientation about the axis.

This flow is generally not parallel to a radius extending outward from the axis nor is it parallel to the axis.

In one example, a seal retainer carrying a filter head seal secures the spinning disc element axially to the tap plate. The seal retainer is operably secured to the canister.

In some examples, the seal retainer is secured to the canister by a crimped end of the canister.

In one example, the seal retainer angularly is secured relative to the canister to a greater extent than the spinning disc element such that a greater amount of torque is required to rotate the seal retainer relative to the canister than to rotate the spinning disc element relative to the seal retainer.

In one example, the seal retainer radially locates the spinning disc element relative to the central opening of the tap plate. This is typically done by radial abutment between the seal retainer and the spinning disc element.

In one example, the media is fluidly interposed between the central threaded opening and the first outer opening such that fluid flowing between the central threaded opening and the first outer opening must pass through the media.

In one example, the first keyed projection is a sloped ramp that is radially outwardly surrounding the central threaded opening in the tap plate. The sloped ramp extends angularly along a portion of the spinning disc element. The first opening is at an elevated end of the ramp.

In one example, the first opening opens in an angular direction such that fluid enters or exits the first opening angularly, i.e. not parallel to a radius or parallel to the axis.

In another example, a filter assembly includes a filter head and a filter element as outlined above is provided. The filter head includes a base and a header spinning disc. The base has a cavity and an axially projecting first alignment rib within the cavity. The header spinning disc is attached to the base adjacent the cavity. The header spinning disc includes a frame with a central threaded spud and a first opening through the frame that is radially outward of the threaded spud. The first alignment rib, first opening in the header spinning disc, and base are configured such that when the header spinning disc is angularly aligned relative to the base such that the first opening in the header spinning disc is angularly offset from the first alignment rib, the first keyed protrusion on the filter element can be received through the first opening and within the cavity of the base to angularly abut the first alignment rib to prevent the header spinning disc from rotating. In such an orientation, the central threaded spud can threadedly engage with the threaded central opening and thereby allow the element to be threaded onto the filter head.

In one example, the first alignment rib, first opening in the header spinning disc, and base are configured such that when the header spinning disc is angularly aligned relative to the base such that the first alignment rib is angularly aligned with the first opening of the header spinning disc, the first alignment rib limits axial insertion of the first keyed protrusion into the header spinning disc such the central threaded spud does not threadedly engage the threaded central opening of the filter element.

In one example, when the header spinning disc is angularly aligned relative to the base such that the first alignment rib is angularly aligned with the first opening of the header spinning disc, the alignment ribs do not angularly abut the first keyed protrusion such that the first keyed protrusion does not inhibit angular rotation of the central threaded spud relative to the base such that header spinning disc and the central threaded spud will rotate relative to the base upon rotation of the cannister when the first keyed protrusion is axially received by the first opening of the header spinning disc and axially abutted against the first alignment rib.

In one example, the header spinning disc is rotatably attached to the base and the spinning disc element is rotatably attached relative to the canister such that a lower amount of torque is required to rotate the header spinning disc relative to the base than is required to rotate the spinning disc element relative to the cannister such that rotation of the canister to threadedly attach the filter element to the filter head will cause the header spinning disc to rotate relative to the base before the spinning disc element will rotate relative to the canister when the spinning disc element is angularly engaged with the header spinning disc.

In one example, the angular engagement between the spinning disc element and the header spinning disc is provided by the first keyed protrusion being inserted into the first opening in the header spinning disc.

In one example, the filter head includes a first fluid flow port in fluid communication with the cavity in the base such that when the filter element is threadedly engaged with the filter spud and the first keyed projection is axially received into the first opening in the header spinning disc and in angular abutment with the first alignment rib, the first opening of the first keyed projection is in fluid communication with the fluid flow port of the filter head permitting fluid flow between the filter head and the filter element.

In one example, the central threaded spud provides a second fluid port for the filter head. When the filter element is installed on the central threaded spud, the filter media of the filter element is fluidly interposed between the first and second fluid ports.

In one example, the base has a plurality of axially-projecting alignment ribs within the cavity arranged in a predetermined configuration. The plurality of axially projecting alignment ribs includes the first alignment rib. The ribs of the plurality of axially projecting alignment ribs are angularly spaced apart forming a gap therebetween. The gap is sized to receive the first keyed projection therein when the first opening in the header spinning disc is aligned with the gap.

In another example, a filter assembly including a filter element as outlined above with the ramp and a filter head are provided. The filter head includes a base with a central threaded hollow spud. An annular groove surrounds the spud. A header disc is attached to the base circumscribing the central threaded spud and covering the annular groove. The header disc includes a circular plate with an inner and an outer surface, the circular plate defines a fluid channel with the base. An opening extends angularly along a selected portion of the circular plate. A flexible flap covers the opening and is connected at a trailing end to a portion of the circular plate defining a trailing edge of the opening. The flap normally lies flat in a plane of the plate closing the opening. A lip is on the outer surface of the plate and is adjacent to a leading edge of the opening in the circular plate. When the filter element is assembled with the filter head, the central threaded opening of the filter element receives the central threaded spud on the filter head. The spinning disc element of the filter element rotates against the outer surface of the header disc until the sloped ramp becomes rotationally aligned with the flap. At that point, the elevated leading end of the ramp pushes the flap inwardly as the filter element is threaded onto the spud. When the leading edge of the ramp engages the lip on the circular plate, the spinning disc of the filter element is rotationally fixed relative to the header disc on the filter head.

In one example, the header disc includes radial inner and outer sidewalls projecting from the inner surface around an inner and the outer perimeter of the plate. The sidewalls project towards the base. The header disc includes an opening extending angularly along a selected portion of the circular plate between leading and trailing edges of the ribs. The header disc includes one or more circumferentially-extending ribs between the inner and outer sidewalls of the circular plate. The one or more circumferentially-extending ribs extend partially around the inner surface of the circular plate.

In one example, the header disc is angularly fixed relative the base.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION

Figure 1:
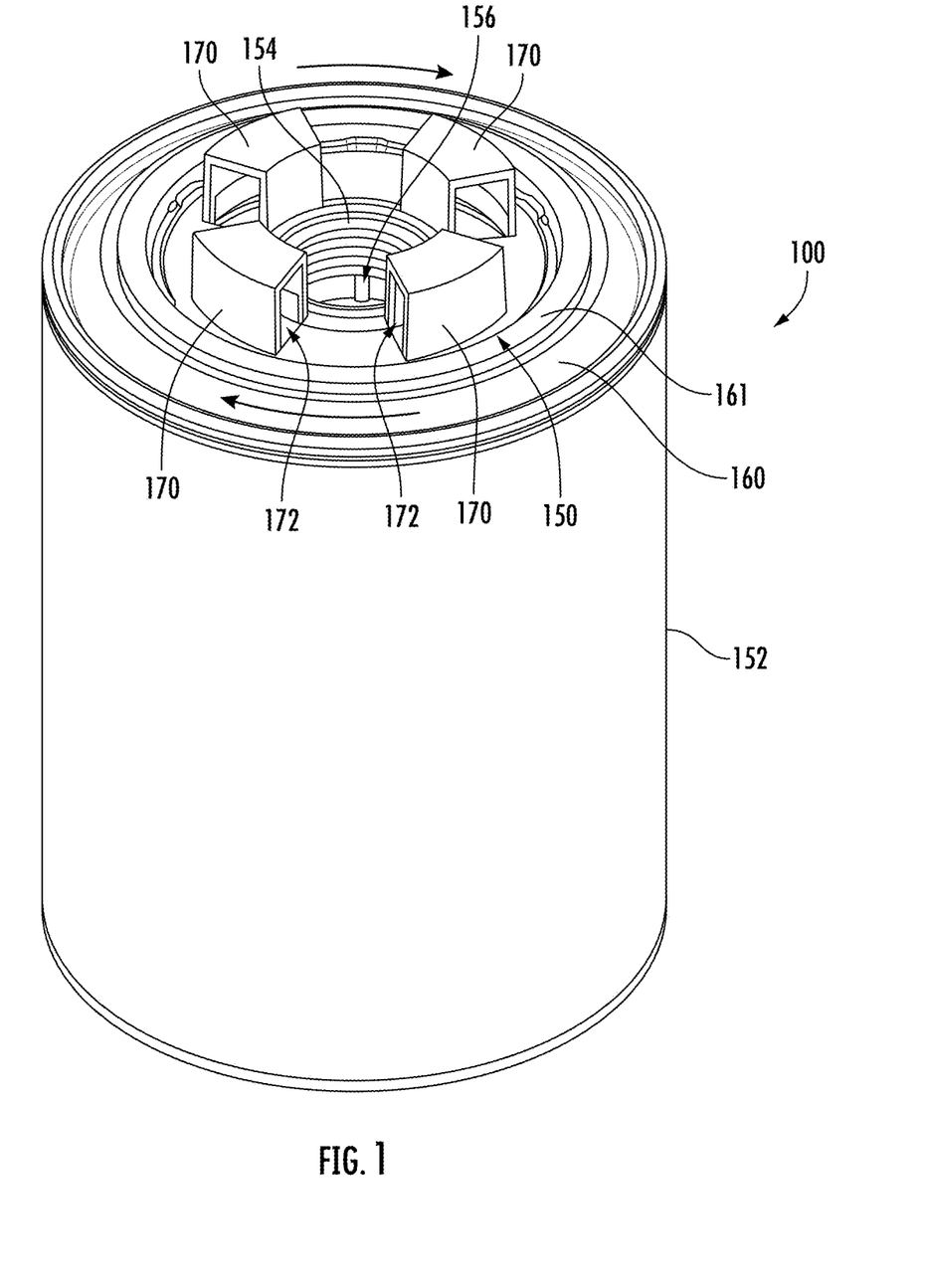
FIG. 1 is a perspective illustration of a filter element having a spinning disc element supported for rotation that has keyed protrusions.
Figures 2, 3, 4:
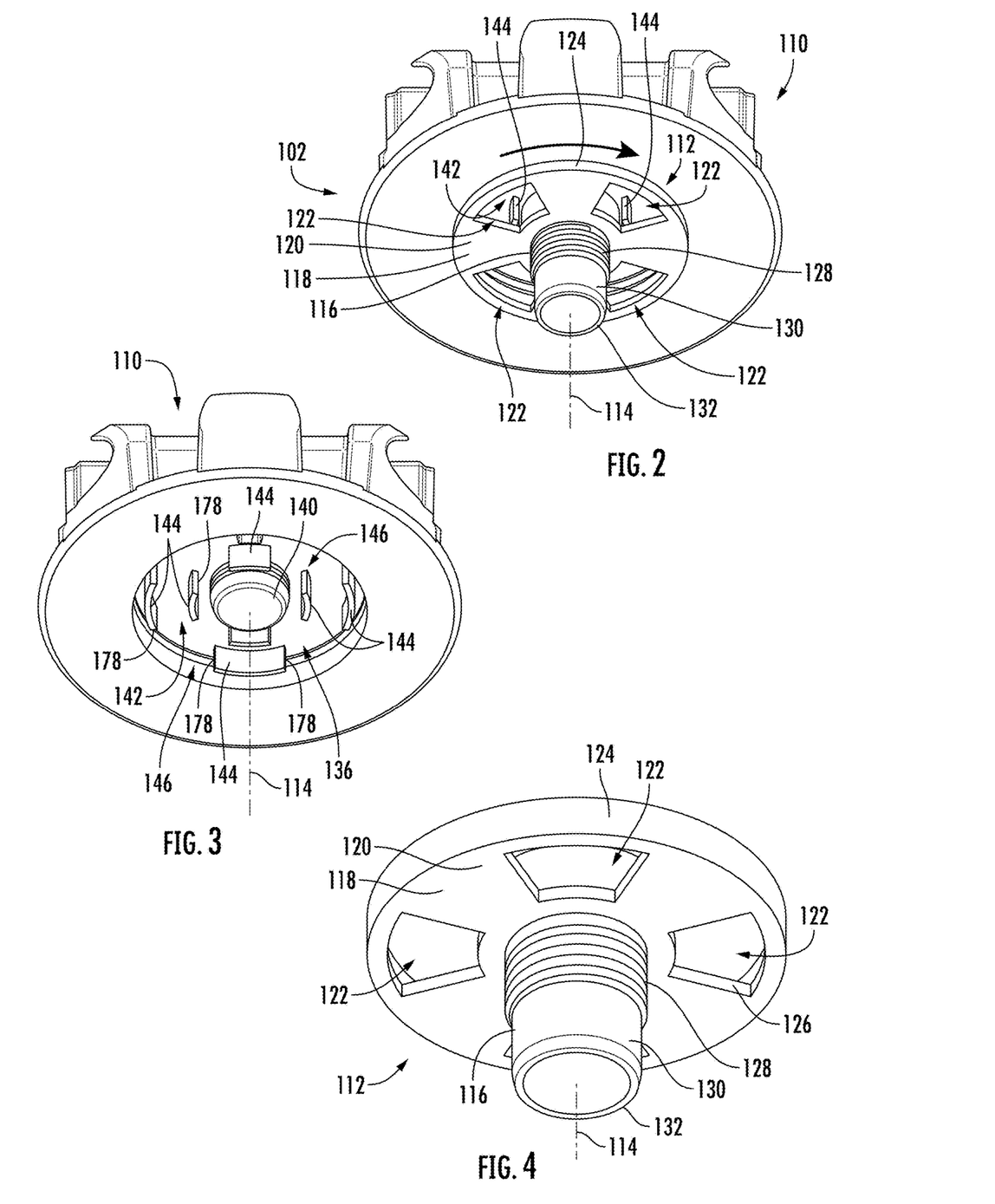
FIG. 2 is a perspective illustration of a filter head for use with the filter element of FIG. 1.
FIG. 3 is an enlarged illustration of the base of the filter head of FIG. 2.
FIG. 4 is an enlarged illustration of a spinning header disc of the filter head of FIG. 2.
Figure 10:
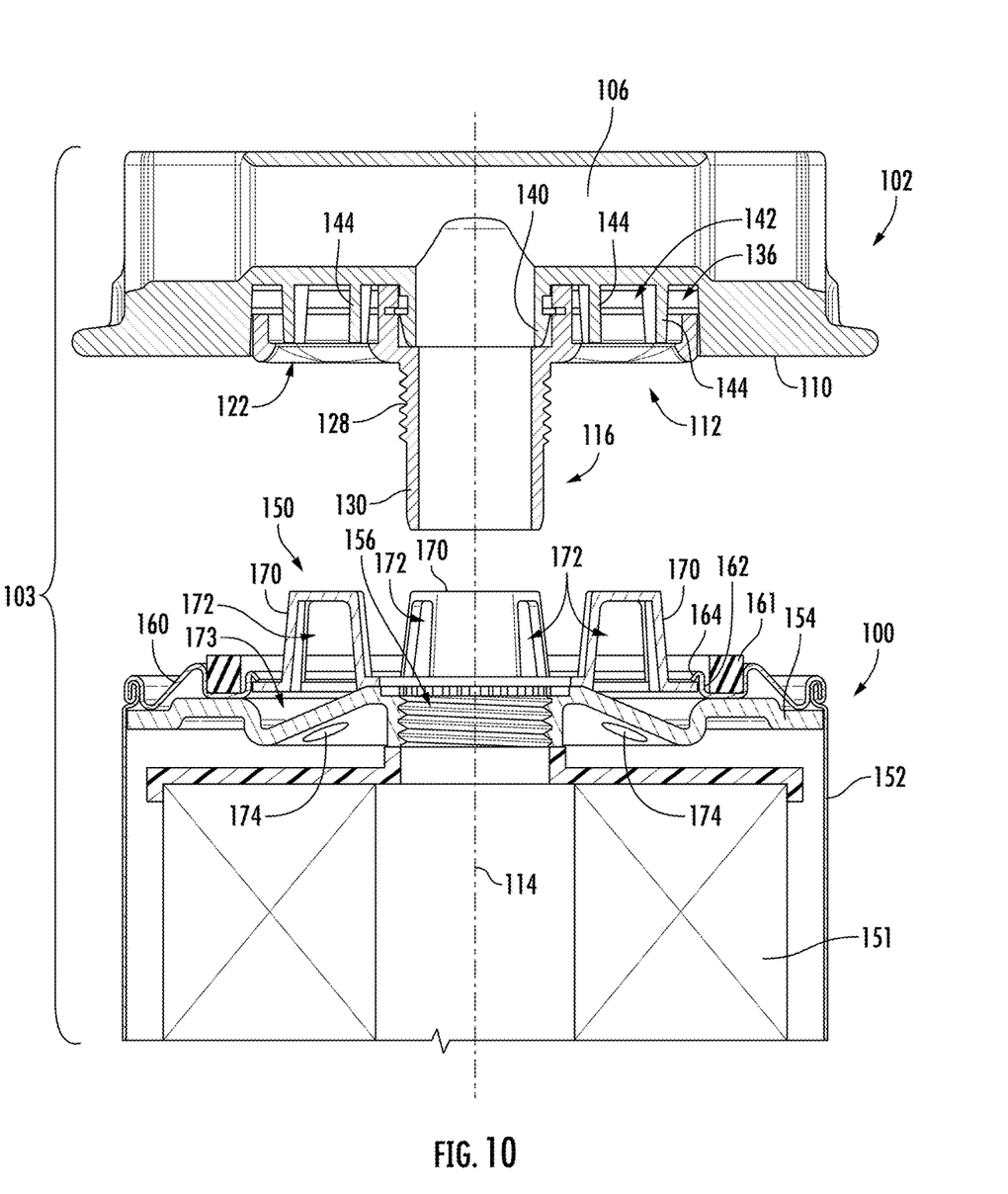
FIGS. 10-13 are cross-sectional illustrations of the progression of mounting a replacement filter element of FIG. 1 on the reusable filter head of FIG. 2.

FIG. 1 illustrates an example of a filter element 100 for use with the filter head 102 of FIG. 2 to for a filter assembly 103 (see FIG. 10). The filter element 100 is operably threadedly mountable to the filter head 102 to filter fluid that passes through the filter system. The filter element 100 is a replaceable filter element 100 that is replaced when spent. The filter head 102 is generally reusable at maintenance intervals.

The filter head 102 includes a fluid inlet 104 (see FIGS. 12 and 13) through which dirty unfiltered fluid flows and a fluid outlet 106 (see FIGS. 10 and 11) through which clean filtered fluid exits. The fluid is filtered by the filter element 100. As such, the fluid inlet is upstream of the filter element 100 and the fluid outlet is downstream of the fluid outlet. Notably, the fluid inlet 104 and fluid outlet 106 can be reversed if the fluid flow through the filter assembly is reversed.

In this example, the filter head 104 includes a base 110 that carries a header disc 112. In this example, the header disc 112 is a header spinning disc as it is rotatably carried by the base 110 for rotation about axis 114.

The header disc 112 includes a threaded spud 116. The threaded spud 116 in this embodiment is hollow and is operably fluidly connected to the fluid outlet of the filter head 104. When the header disc 112 rotates relative to the base 110, the threaded spud 116 generally rotates about axis 114.

The header disc 112 includes a frame 118. The threaded spud 116 extends axially outward from an outer side 117 of an annular portion 120 of the frame 118 along axis 114. The annular portion 120 includes a plurality of openings 122. The annular portion 120 provides a plurality of imperforate regions interposed between the openings 122. The openings 122 are spaced radially outward of the threaded spud 116 and are angularly spaced apart about the threaded spud 116.

An axially extending annular sidewall 124 extends from an inner side 126 of the annular portion 120 which is opposite the outer side 117 from which the threaded spud 116 extends. The sidewall 124 is located proximate an outer periphery of the annular portion 120

The threaded spud 116 includes a threaded region 128 proximate the annular portion 120 and an unthreaded portion 130 proximate a distal end 132 of the threaded spud 116.

In this example the threaded spud 116, annular portion 120 and sidewall 124 are formed from a single continuous piece of material. However, these components could be formed as separate components and then operably secured to one another.

With reference to FIG. 3, the base 110 defines a central cavity 136. The header disc 112 is operably mounted to the base 110 adjacent the central cavity 136. The header disc 112 is rotatably attached to the base 110 by a central component in the form of an annular sidewall 140. The threaded spud 116 is operably fluidly sealed to the annular sidewall 140 to prevent fluid leakage between the threaded spud 116 and the annular sidewall 140. The seal may be provided directly between the portion of the header disc 112 and the base 110 or a seal, such as an o-ring or other seal member, could be provided between the components. The seal permits rotation between the components while generally maintaining sealing capabilities.

A snap ring or other mechanical device can rotatably attach the header disc 112 to the annular sidewall 140.

An annular cavity 142 is formed around the annular sidewall 140. Within central cavity 136.

A plurality of alignment ribs 144 are located within the central cavity 136. The ribs are located angularly outward from the annular wall 140 and are angularly spaced about axis 114. There are angular gaps formed between angularly adjacent sets of alignment ribs 144. The alignment ribs 144 are attached at a bottom of central cavity 136 and project axially outward. In this example, the alignment ribs 144 are provided in pairs of ribs at a single angular location about axis 114. Further, the alignment ribs 144 do not prevent fluid flow within annular cavity 142.

In use, the filter head 102 is attached within a fluid system, and fluid flow upstream of the filter head 102 is directed into the filter head 102 through the inlet port and into the central cavity 136 and particularly into the annular cavity 142 surrounding the annular wall 142.

Flow, after passing through an attached filter element 100, is also directed out through the hollow threaded spud 116 and out of the filter head 102 to downstream components.

Figure 5:
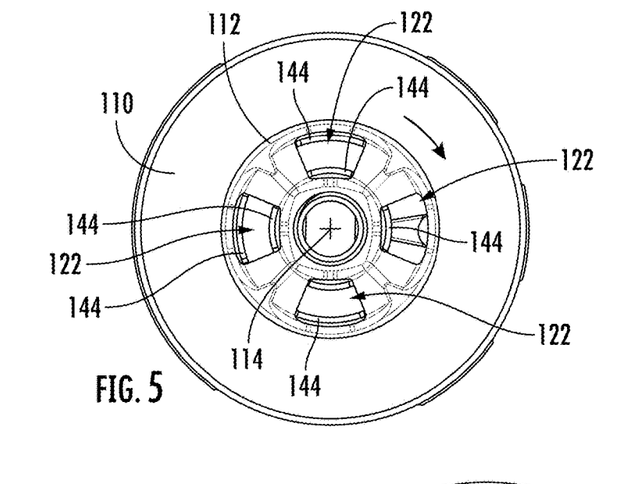
FIGS. 5 and 6 illustrate the header disc of the filter head of FIG. 2 in a first orientation wherein the alignment ribs block insertion of the keyed protrusions of the filter element into openings in the header disc.
Figure 6:
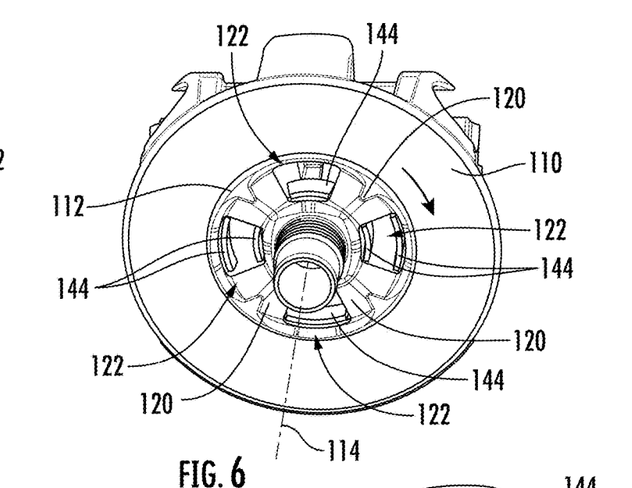

FIGS. 5 and 6 illustrate the header disc 112 angularly oriented relative to the base 110 and particularly alignment ribs 144 such that openings 122 are aligned with the alignment ribs 144.

Figure 7:
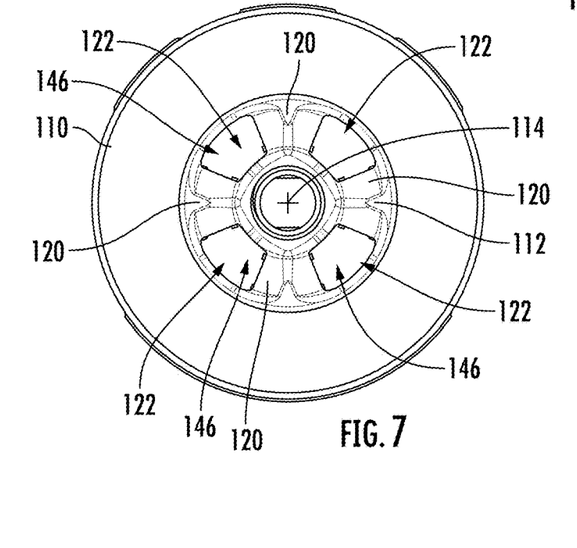
FIGS. 7 and 8 illustrate the header disc of the filter head of FIG. 2 in a second orientation wherein the alignment ribs are angularly offset from the openings in the header disc permitting insertion of the keyed protrusions of the filter element to permit spin on mounting of the filter element to the filter head.
Figure 8:
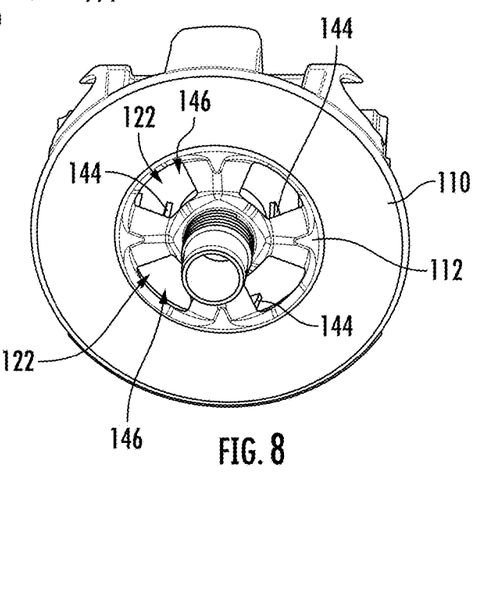

FIGS. 7 and 8 illustrate the header disc rotated about central axis 114 relative to base 110 such that the alignment ribs 144 are angularly offset from the openings 122 and generally in the same angular location as imperforate regions 120 about axis 114.

Figure 9:
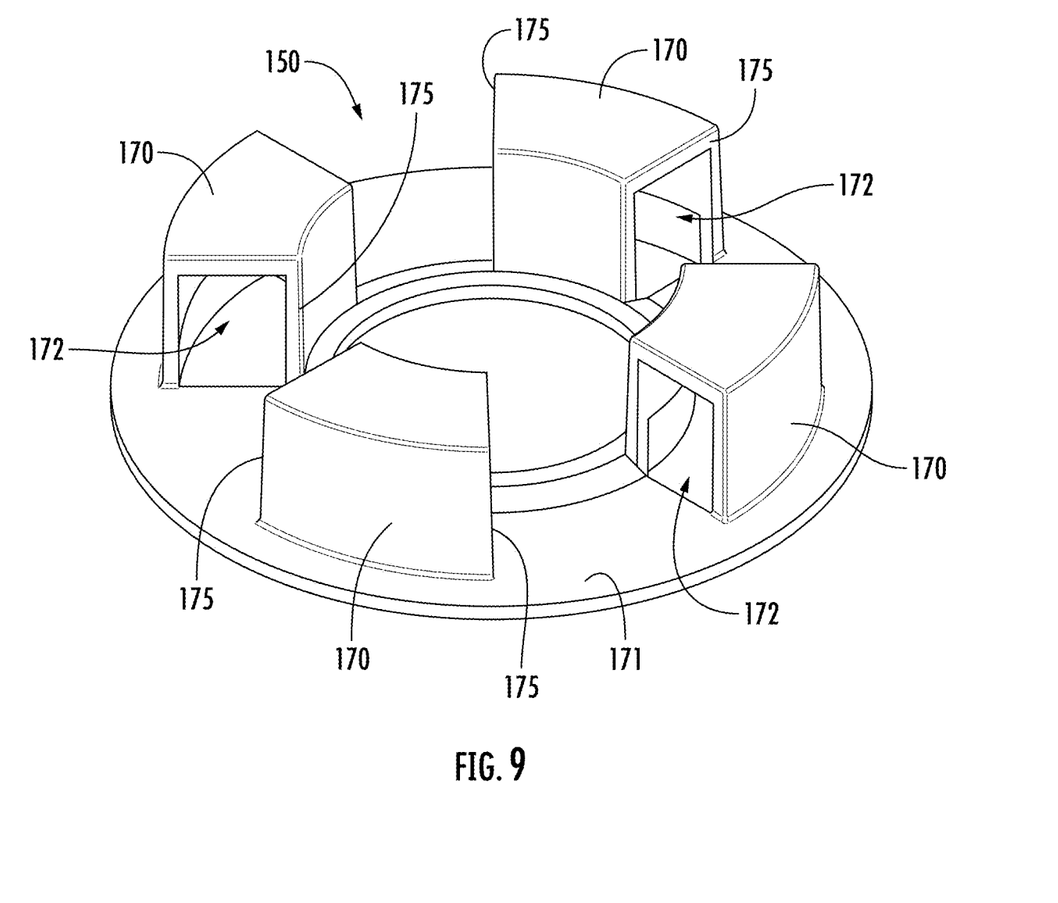
FIG. 9 is a perspective illustration of a spinning disc element of the filter element.

With reference to FIGS. 1, 9 and 10, the filter element 100 has an annular spinning disc element 150 that is supported on one end of the filter element 100. The filter element 100 includes a canister body 152 with a ring of filtration media 151 (see FIGS. 10-13). The spinning disc element 150 is axially biased against a tap plate 154 by a retainer 160. The retainer 160, in this example, is crimped to a free end of the sidewall of canister 152. The retainer 160 may have an annular slot for receiving a filter head seal 161. that includes a central threaded opening 156 for operably threadedly attaching the filter element 100 to the threaded spud 116 of the filter head.

The retainer 160 includes an axially extending wall portion 162 that receives the outer periphery of the spinning disc element 150 and radially locates the spinning disc element 150 relative to axis 114. A distal end 164 of the axially extending wall portion 162 is curled radially inward and over an outer surface 171 of a body 166 of the spinning disc element 150 to secure the spinning disc element 150 axially against tap plate 154. In this example, the curled distal end 164 abuts the outer surface 171 proximate a radially outer periphery of body 166.

The spinning disc element 150 is axially biased against the tap plate 154 such that the spinning disc element 150 is permitted to rotate relative to the tap plate 154 and the retainer 160. The spinning disc element 150 can normally spin at the end of the filter element 100 when an external force is applied.

The body 166 of the spinning disc element 150 is generally annular with a central opening 168. The central opening 168 is larger than the threaded opening 156 of the tap plate 154. This allows mating engagement of the threaded spud 116 and threaded opening 156 in operation.

The spinning disc element 150 has one or more keyed protrusions 170 that project outwardly from an outer surface 171 of the body 166 of spinning disc element 150. The keyed protrusions 170 have openings 172 that act as channels for fluid to flow through the spinning disc element 150 and into openings 174 in the underlying tap late 154. The fluid flows through the openings 172 into the gap 173 between the spinning disc element 150 and then through openings 174 into the, through the media 151 and into a center cavity thereof 110, and then out through threaded spud 116 to the filter head when the filter element is installed on the head.

Figure 11:
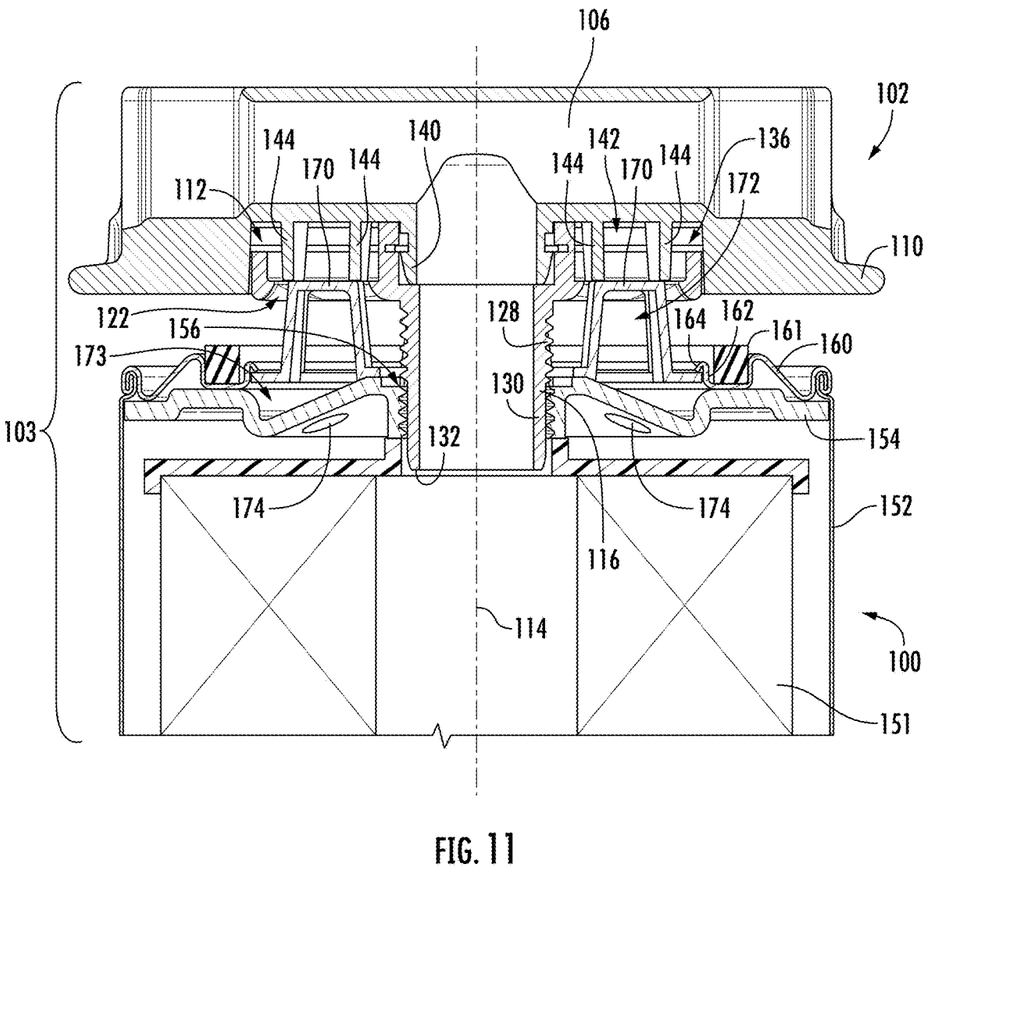
Figure 12:
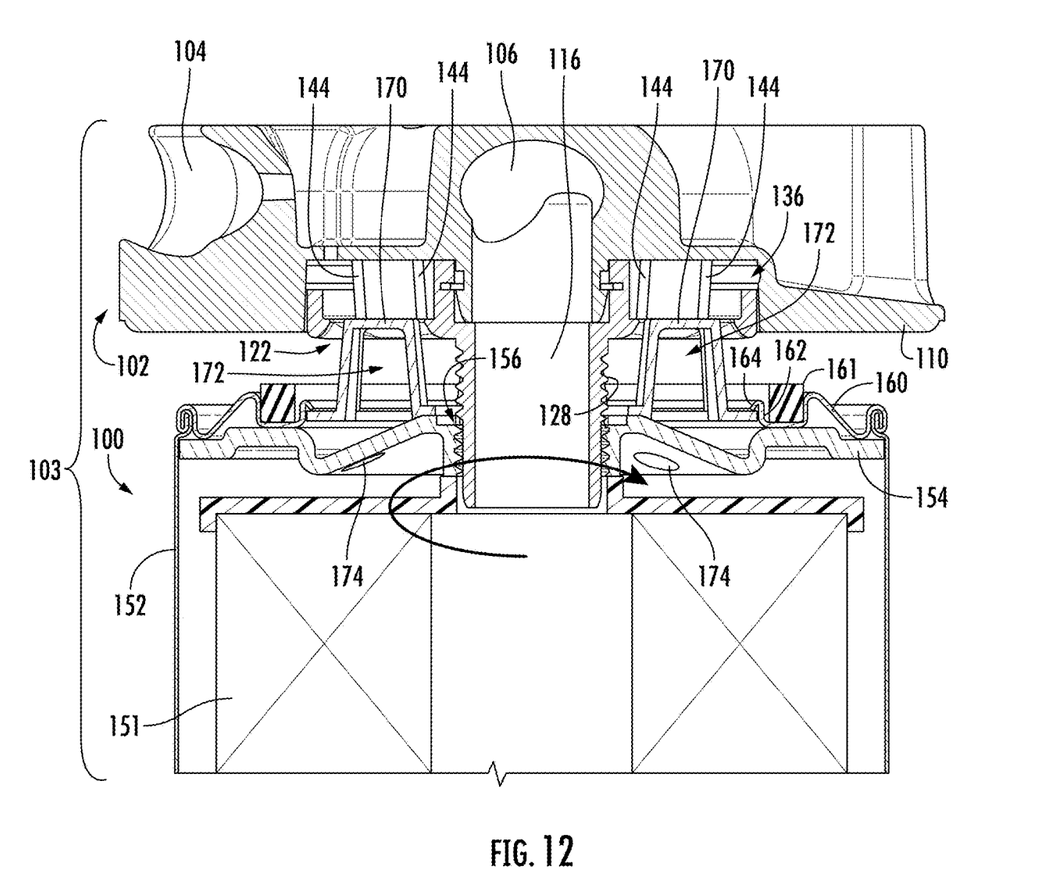

The keyed protrusions 170 are sized and shaped to pass axially through openings 122 in header disc 112. As illustrated in FIG. 11, when the alignment ribs 144 are aligned with openings 122, the outer most ends of the keyed protrusions 170 will axially abut the alignment ribs 144 inhibiting continued insertion of the keyed protrusions 170 into the openings 122 and into cavity 136 of base 110.

This prevents the threads on threaded spud 116 from threadedly engaging threads of the threaded opening 156 of tap plate 154. As such, the filter element 100 cannot be secured to the filter head 102 when the header disc 112 is in this angular orientation relative to the filter base 110.

However, it is noted that a portion of the keyed protrusions 170 is axially revied in the corresponding opening 122 of the header disc 112. As such, when a user rotates the filter element 100 about axis 114, the spinning disc element 150 will rotate the header disc 112 about axis 114.

Once the openings 122 are aligned with gaps 146 (FIG. 3) between angularly adjacent alignment ribs 144, the keyed protrusions 170 can be further axially inserted through openings 122 and the threads of the threaded spud 116 can threadedly engage the threads of the threaded opening 156 of the tap plate 154.

Further, as the keyed protrusions 170 are inserted further into the cavity 136 and slide axially past angular end faces 178 of the alignment ribs 144 (see FIG. 3), the angular end faces 175 in which openings 172 are formed (see FIG. 9) will abut the angular end faces 178 of the alignment ribs 144. This angular abutment between these features angularly locks the header disc 112 relative to base 110 preventing rotation therebetween. This allows torque applied to the filter element 100 to thread the filter element 100 tap plate 154 to the threaded spud 116.

If the keyed protrusions 170 are not in angular abutment with the alignment ribs 144 the header disc 112 can free rotate under the torque applied by rotating the filter element 100. This rotation of the header disc 112 with the rotating filter element 100 also rotates the threaded spud 116, which, in turn, prevents threading the threaded opening 156 and tap plate 154 onto the threaded spud 116. Thus, a filter element 100 that does not include the keyed protrusions 170 will not be able to be threadedly mounted to threaded spud 116.

In this example, the amount of torque required to rotate the spinning disc element 150 relative to the tap plate 154 and/or canister 151 is greater than the amount of torque required to rotate the header disc 112 relative to the base 110. This allows the user to rotate the header disc 112 using the engagement of the spinning disc element 150 (via the keyed protrusions 170) and the header disc 112 (via openings 122) to rotate the header disc 112 such that openings 122 are aligned with gaps 146 during installation.

This alignment of openings 122 and gap 146 is illustrated in FIGS. 7 and 8. In this orientation, the alignment ribs 144 are generally hidden behind the imperforate regions 120 of the frame 118 of the header disc 112.

Again, when the header disc 112 is in the angular orientation as illustrated in FIGS. 5 and 6, where the alignment ribs 144 align with openings 122, the alignment ribs 144 prevent sufficient insertion of the keyed protrusions into the cavity 136 to permit threading the filter element 100 on to filter spud 116.

For completeness, FIGS. 5, 6, 10 and 11 illustrate the alignment ribs 144 aligned with openings 122 and obstruct the openings 122 such that keyed protrusions 170 cannot be fully inserted. FIGS. 7, 8, 12 and 13 illustrate the header disc 112 rotated relative to base 110 such that the keyed protrusions 170 can slide past the alignment ribs 144 into the gaps angularly between the alignment ribs and into angular engagement therewith to permit threaded engagement between tap plate 154 and threaded spud 116. In operation, this transition from FIGS. 5, 6, 10 and 11 to FIGS. 7, 8, 12, and 13 occurs by engagement of the keyed protrusions 170 and the portion of the header disc 112 forming openings 122 therein as the filter element 100 is rotated relative to the base 110.

Figure 13:
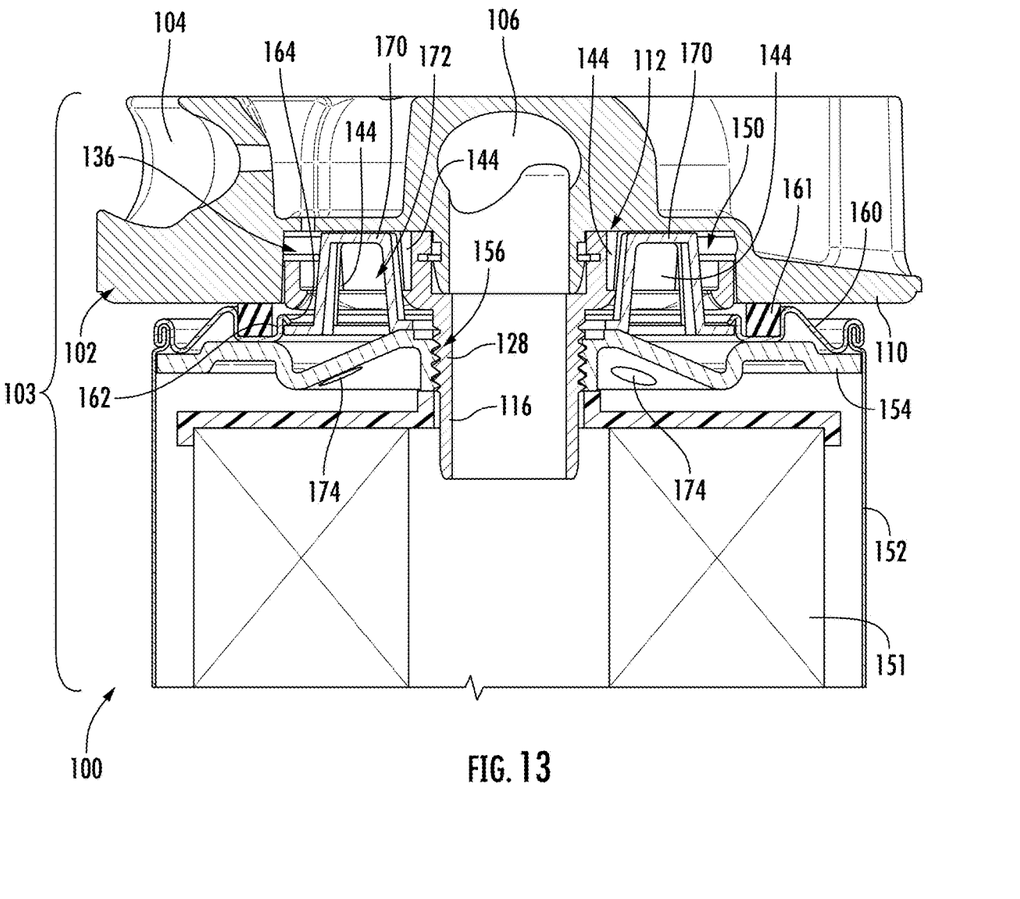

FIG. 13 shows the filter element 100 fully threaded onto threaded spud 116. The seal of the filter element is drawn up against the seal face of the filter base 110.

Flow into the filter head 102 from upstream components is directed into the cavity 136 in the base 110 of the filter head 102, through the openings 172 in the keyed protrusions 170 of the spinning disc element 150, and through the underlying openings 174 in the tap plate 154, and into the canister 152 of the element 100. As the fluid flows through the filter media 151, particulate and other contaminants are removed. The clean flow then is directed out through the center of the filter media and then through the threaded spud 116 and threaded central opening 156 in the tap plate 154 and through the opening provided by the annular configuration of the spinning disc element 150. The clean fluid flows through the filter head 102 and then to downstream components in the fluid system.

When it is desired to remove a spent element 100 from the filter head 102, the flow to the filter head 102 is stopped, and the filter element 100 is spun in the opposite direction until the threaded spud 116 is detached from the central opening 156 in the tap plate 154. Any remaining fluid in the head 102 is directed through the openings 172 in the keyed protrusions 170 into the filter element 100 as the filter element 100 is removed, which minimizes if not prevents spillage.

Notably, a greater amount of torque is required to rotate the tap plate 154 about axis 114 relative to canister 151 than is required to rotate the spinning disc element 150 relative to the tap plate 154. Further, the amount of torque to rotate the spinning disc element 150 relative to the canister is greater than the amount of torque required to rotate the header disc 112 relative to base 110.

FIGS. 14-19 illustrate a further example of a filter assembly. Again, the filter assembly includes a filter element 200 and a filter head 202. The filter element 200 is removably attachable to the filter head 202 so that it can be replaced once spent. The filter element 200 is a spin on filter element that is threadedly attached to the filter head 202.

Figure 14:
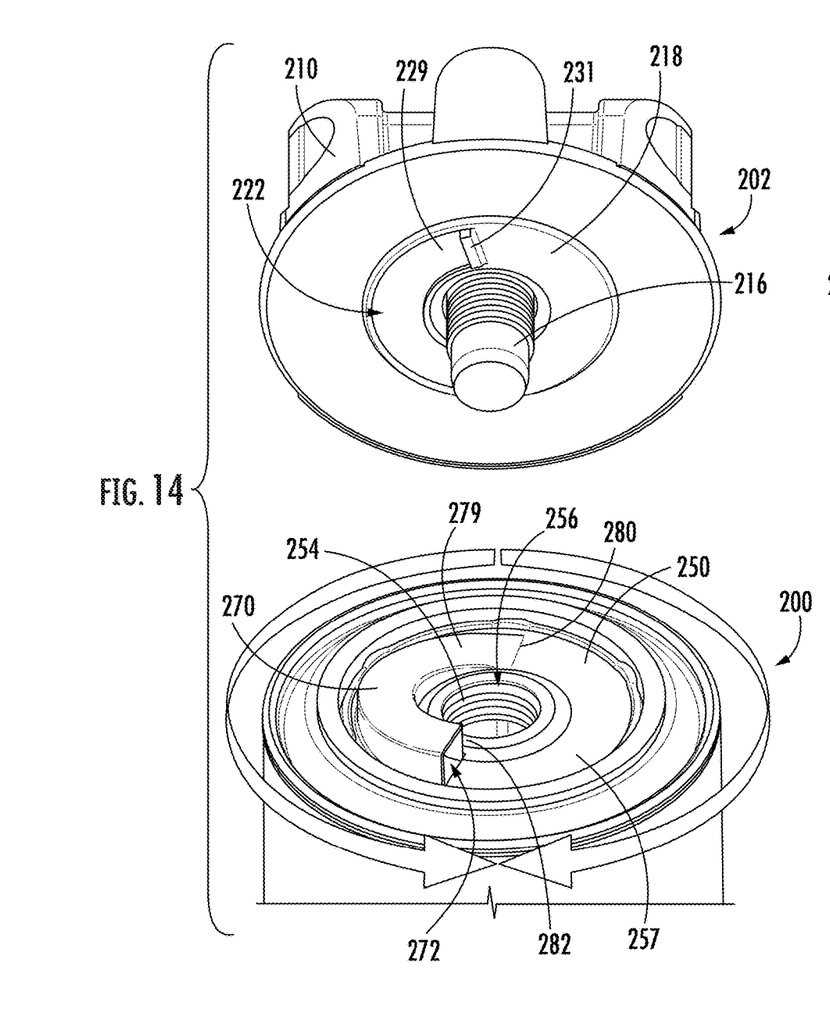
FIG. 14 is a partial perspective exploded illustration of a further filter assembly including a filter head and a filter element.
Figure 15:
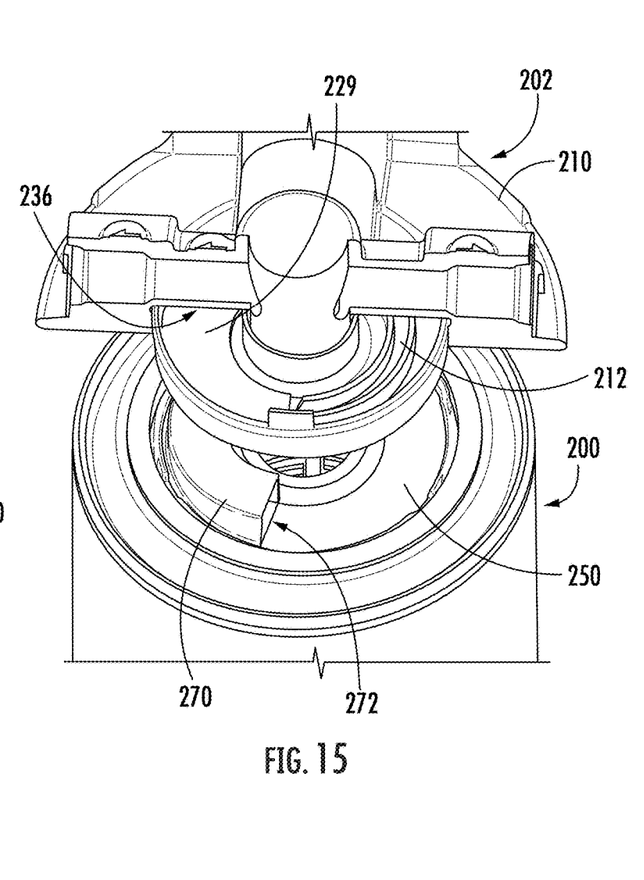
FIG. 15 is an exploded and partial cross-sectional illustration of the filter assembly of FIG. 14.

The filter element 200 is similar to filter element 100. In this example, rather than having a plurality of keyed protrusions, the spinning disc element 250 includes a single keyed protrusion 270. The keyed protrusion includes opening 272 that is angularly directed.

In this example, the keyed protrusion 270 is in the form of a sloped ramp 279 that is radially outward of and extends angularly about the central threaded opening 256 of tap plate 254.

The sloped ramp 279 extends from a first end 280 (trailing end) to a second end 282 (leading end). The terms trailing and leading are used for illustrative purposes and generally refer to the which end is in front of the other during mounting of the filter element.

The sloped ramp 279 begins axially sloping away from an annular disc portion 257 of the spinning disc element 250 at first end 280 until it reaches second end 282 which is provided by an elevated leading end that provides opening 272. The sloped ramp 279 extends only a portion of the disc portion 257 of the spinning disc element 250.

In one example, the sloped ramp 279 has a continuous gradient as it extends outward from the disc portion 257.

In this example, the filter head 202 has been modified as well. In this example, the header disc 212 is angularly fixed relative to base 210 of the filter head 202. Further, the threaded spud 216 is angularly fixed relative to the filter base 210 with or without the filter element 200 attached to the filter head 202.

The header disc 212 is again attached to the filter base 210 proximate a central cavity 236 of the filter base.

In this example, the header disc 212 includes a circular plate 218 with an inner and outer surface. The circular plate 218 helps define a fluid channel within the base 210 of the filter head.

The circular plate 218 includes an opening 222 that extends angularly along a selected portion of the circular plate 218. A lip 231 extends from an outer surface of the circular plate 218 and is positioned adjacent a leading edge 231 of the opening 222.

A flexible flap 229 covers the opening 222 and is freely supported proximate the leading edge 231 of the opening 222. The flexible flap 229 is secured to the circular plate 218 adjacent the trailing edge of the opening 222. The flap 229 is generally located within cavity 236 and inward of circular plate 218.

The flexible flap 229 can be biased inwardly when an external force is applied to the flap 229. The leading end of the flap 229 can be bent inwardly towards the base 210, thus creating an opening in the circular plate 218.

In this example and with reference to FIGS. 16-19, when the filter element 200 is assembled with the filter head 202, the central threaded opening 256 of the filter element 200 receives the central threaded spud 216 of the filter head 202. The spinning disc element 250 rotates against the outer surface of the circular plate 218 of the header disc 212 until the sloped ramp 279 becomes rotationally aligned with the flap 229 and opening 222. In this alignment, the elevated leading edge 282 of the ramp 279 pushes the flap 229 inwardly into cavity 236 of the filter head 202 as the filter element 200 is threaded onto the spud 216 and is axially drawn toward the filter head 202. When the leading edge 282 of the ramp 279 engages the lip 231 on the circular plate 218, the spinning disc element 250 of the filter element 200 is rotationally fixed relative to the header disc 212 and the filter head 202.

The ramp 279 can bend the flap 229 inwards way from the plane of the circular plate 218.

Figure 16:
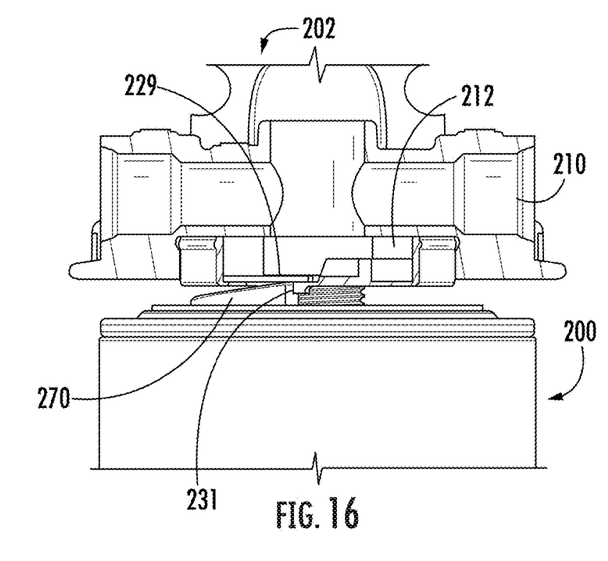
FIGS. 16 and 17 illustrate the filter element beginning to be mounted to the filter head with a keyed protrusion in the form of a ramp beginning to bias a flap that closes an opening of a header disc of the filter head.
Figure 17:
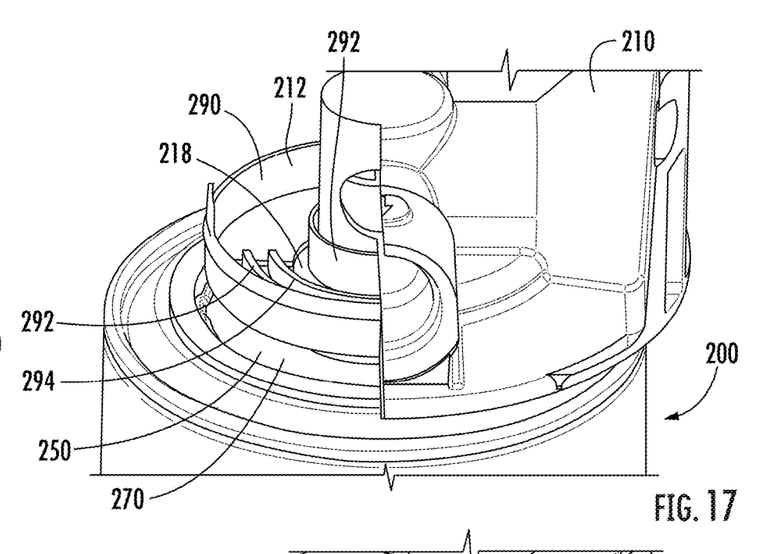

In other examples, the flap 229 could be affixed on an outer surface of the disc FIG. 16 shows the leading edge 282 in angular abutment with lip 231 angularly fixing the spinning disc element 250 relative to the filter head 202 and particularly base 210.

Figure 18:
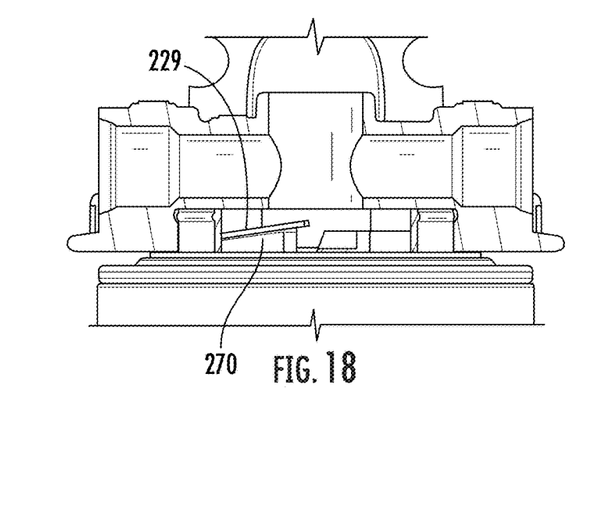
FIGS. 18 and 19 illustrate the filter element mounted to the filter head with the ramped keyed protrusion biasing the flap to an open position permitting fluid flow between the filter element and the filter head.
Figure 19:
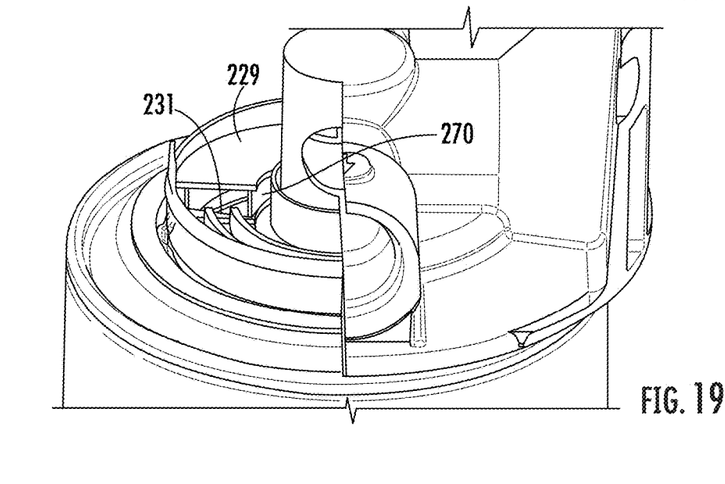

FIGS. 18 and 19 illustrate the filter element 200 being threaded further onto the threaded spud 216 with the ramp 279 axially received through opening 222 such that the free end of the flap 229 is pushed away from the inner surface of the circular disc 218. In this configuration, fluid can flow between the filter element 200 and cavity 236 of the filter head through opening 272 in the keyed protrusion in the form of ramp 279.

The header disc 212 includes a pair of annular sidewalls 290, 292 that project from an inner side of the circular disc 218. A pair of angularly extending ribs 294, 296 extend partially around the inner surface of the circular disc 218.

As the filter element 200 is continually threaded on to the threaded spud 216, the ramp 279 continues to push the flap 229 into the central cavity 236. The opening 272 aligns with and faces ribs 294, 296.

When fluid to be filtered from the fluid system is introduced through the filter head 202, the fluid enters the filter head 202, flows into the channels formed by ribs 294, 296 and walls 290, 292 and is directed into the opening 272 in the end of ramp 279. The fluid then flows through the sloped ramp 279, through opening 222 in the circular disc 218 and through the underlying openings 274 in the tap plate 254. Thereafter, the fluid flows through the media (not shown in this example), where particulate and contaminants are removed. The filtered fluid then passes out of the filter element 200 through the central opening 256 in the tap plate 254 via the hollow threaded spud 216 and back through the filter head 202 and on to the fluid system.

In one embodiment, the opening 222 and flap 229 extending angularly about the central axis 214 between about 60 and 120 degrees and more particularly about 75-105 degrees.

While the examples above are generally illustrated as radially inward directed flow through the filter elements and wherein clean fluid exits through the threaded spud, it is contemplated that fluid flow in some examples could be reversed to radially outward directed flow.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A filter element, comprising:
   a canister circumscribing a central axis and including a tap plate at an end of the canister, the tap plate including a central threaded opening along the central axis of the canister, and a first outer opening radially spaced between the central opening and a periphery of the tap plate;
   media supported centrally within the canister;
   a spinning disc element supported for rotation on the tap plate, a first keyed protrusion projecting outwardly from the spinning disc element, the first keyed protrusion defining a first flow opening;
   wherein the spinning disc element is rotatable about the central axis when under an external force, and wherein the first outer opening is in fluid communication with the first opening of the first keyed protrusion such that fluid can pass between the first opening of the first keyed protrusion and the first outer opening in the tap plate into or out of the canister; and
   wherein the first keyed protrusion extends axially outward beyond the tap plate.

2. The filter element of claim 1, further comprising a second keyed protrusion projecting outwardly from the spinning disc element, the second keyed protrusion defining a second flow opening, the second flow opening in fluid communication with the first flow opening and the first outer opening in a region formed between the tap plate and a body portion of the spinning disc element from which the first and second keyed protrusions project.

3. The filter element of claim 2, wherein:
the body portion of the spinning disc element is generally annular with an imperforate region extending angularly between the first and second keyed protrusions;
the body portion defining a central opening that circumscribes the central threaded opening of the tap plate; and
the first and second openings open angularly about the axis such that fluid flow into or out of the first and second openings is in an angular orientation about the axis.

4. The filter element of claim 1, further comprising an annular filter head seal that circumscribes the spinning disc element.

5. The filter element of claim 1, wherein a greater amount of torque is required to rotate the tap plate relative to the canister than to rotate the spinning disc element relative to the tap plate such that torque applied to the cannister is transferred to the spinning disc element to rotate the spinning disc element relative to the tap plate rather than to rotate the tap plate relative to the canister.

6. The filter element of claim 1, wherein the spinning disc element is axially biased against the tap plate.

7. The filter element of claim 1, wherein the spinning disc element has a central opening that circumscribes the central threaded opening of the tap plate.

8. The filter element of claim 1, wherein the media is fluidly interposed between the central threaded opening and the first outer opening such that fluid flowing between the central threaded opening and the first outer opening must pass through the media.

9. The filter element of claim 1, wherein the first keyed projection is a sloped ramp, radially outwardly surrounding the central threaded opening in the tap plate, the sloped ramp extending angularly along a portion of the spinning disc element, the first opening being at an elevated end of the ramp.

10. The filter element of claim 9, wherein the first opening opens in an angular direction such that fluid enters or exits the first opening angularly.

11. A filter assembly comprising:
the filter element of claim 9; and
a filter head, the filter head comprising:
a base with a central threaded hollow spud, an annular groove surrounding the spud, and a header disc attached to the base circumscribing the central threaded spud and covering the annular groove;
the header disc including a circular plate with an inner and an outer surface, the circular plate defining a fluid channel with the base;
an opening extending angularly along a selected portion of the circular plate;
a flexible flap covering the opening, and connected at a trailing end to a portion of the circular plate defining a trailing edge of the opening, wherein the flap normally lies flat in a plane of the plate; and
a lip on the outer surface of the plate, adjacent to a leading edge of the opening in the circular plate;
wherein when the filter element is assembled with the filter head, the central threaded opening of the filter element receives the central threaded spud on the filter head, and the spinning disc element of the filter element rotates against the outer surface of the header disc, until the sloped ramp becomes rotationally aligned with the flap, at which point the elevated leading end of the ramp pushes the flap inwardly as the filter element is threaded onto the spud, when the leading edge of the ramp engages the lip on the circular plate, the spinning disc of the filter element is rotationally fixed relative to the header disc on the filter head.

12. The filter assembly of claim 11, wherein:
the header disc includes radial inner and outer sidewalls projecting from the inner surface around an inner and the outer perimeter of the plate, the sidewalls projecting towards the base;
the header disc includes an opening extending angularly along a selected portion of the circular plate between leading and trailing edges of ribs and
the header disc includes one or more circumferentially-extending ribs between the inner and outer sidewalls of the circular plate, the one or more circumferentially-extending ribs extend partially around the inner surface of the circular plate.

13. The filter assembly of claim 11, wherein the header disc is angularly fixed relative the base.

14. A filter element, comprising:
a canister circumscribing a central axis and including a tap plate at an end of the canister, the tap plate including a central threaded opening along the central axis of the canister, and a first outer opening radially spaced between the central opening and a periphery of the tap plate;
media supported centrally within the canister;
a spinning disc element supported for rotation on the tap plate, a first keyed protrusion projecting outwardly from the spinning disc element, the first keyed protrusion defining a first flow opening:
wherein the spinning disc element is rotatable about the central axis when under an external force, and wherein the first outer opening is in fluid communication with the first opening of the first keyed protrusion such that fluid can pass between the first opening of the first keyed protrusion and the first outer opening in the tap plate into or out of the canister; and
wherein the first keyed protrusion forms an axial extent of the filter element.

15. A filter element. comprising:
a canister circumscribing a central axis and including a tap plate at an end of the canister, the tap plate including a central threaded opening along the central axis of the canister, and a first outer opening radially spaced between the central opening and a periphery of the tap plate;
media supported centrally within the canister;
a spinning disc element supported for rotation on the tap plate, a first keyed protrusion projecting outwardly from the spinning disc element, the first keyed protrusion defining a first flow opening:
wherein the spinning disc element is rotatable about the central axis when under an external force, and wherein the first outer opening is in fluid communication with the first opening of the first keyed protrusion such that fluid can pass between the first opening of the first keyed protrusion and the first outer opening in the tap plate into or out of the canister:

a seal retainer carrying a filter head seal, the spinning disc element axially secured to the tap plate by the seal retainer, the seal retainer being operably secured to the canister.

16. The filter element of claim 15, wherein the seal retainer angularly secured relative to the canister to a greater extent than the spinning disc element such that a greater amount of torque is required to rotate the seal retainer relative to the canister than to rotate the spinning disc element relative to the seal retainer.

17. The filter element of claim 15, wherein the seal retainer radially locates the spinning disc element relative to the central opening of the tap plate.

18. A filter assembly including:
a filter element comprising:
  a canister circumscribing a central axis and including a tap plate at an end of the canister, the tap plate including a central threaded opening along the central axis of the canister, and a first outer opening radially spaced between the central opening and a periphery of the tap plate;
  media supported centrally within the canister;
  a spinning disc element supported for rotation on the tap plate, a first keyed protrusion projecting outwardly from the spinning disc element, the first keyed protrusion defining a first flow opening;
  wherein the spinning disc element is rotatable about the central axis when under an external force, and wherein the first outer opening is in fluid communication with the first opening of the first keyed protrusion such that fluid can pass between the first opening of the first keyed protrusion and the first outer opening in the tap plate into or out of
a filter head, the filter head comprising:
  a base having a cavity and an axially projecting first alignment rib within the cavity, and
  a header spinning disc rotatably attached to the base adjacent the cavity, the header spinning disc including a frame with a central threaded spud and a first opening through the frame radially outward of the threaded spud;
  the first alignment rib, first opening in the header spinning disc, and base are configured such that when the header spinning disc is angularly aligned relative to the base such that the first opening in the header spinning disc is angularly offset from the first alignment rib, the first keyed protrusion on the filter element can be received through the first opening and within the cavity of the base, and angularly abut the first alignment rib to prevent the header spinning disc from rotating, and the central threaded spud can threadedly engage with the threaded central opening and thereby allow the element to be threaded onto the filter head.

19. The filter assembly of claim 18, wherein the first alignment rib, first opening in the header spinning disc, and base are configured such that when the header spinning disc is angularly aligned relative to the base such that the first alignment rib is angularly aligned with the first opening of the header spinning disc, the first alignment rib limits axial insertion of the first keyed protrusion into the header spinning disc such that the central threaded spud does not threadedly engage the threaded central opening of the filter element.

20. The filter assembly of claim 19, wherein when the header spinning disc is angularly aligned relative to the base such that the first alignment rib is angularly aligned with the first opening of the header spinning disc, the alignment ribs do not angularly abut the first keyed protrusion such that the first keyed protrusion does not inhibit angular rotation of the central threaded spud relative to the base such that header spinning disc and the central threaded spud will rotate relative to the base upon rotation of the cannister when the first keyed protrusion is axially received by the first opening of the header spinning disc and axially abutted against the first alignment rib.

21. The filter assembly of claim 18, wherein the header spinning disc is rotatably attached to the base and the spinning disc element is rotatably attached relative to the canister such that a lower amount of torque is required to rotate the header spinning disc relative to the base than is required to rotate the spinning disc element relative to the cannister such that rotation of the canister to threadedly attach the filter element to the filter head will cause the header spinning disc to rotate relative to the base before the spinning disc element will rotate relative to the canister when the spinning disc element is angularly engaged with the header spinning disc.

22. The filter assembly of claim 21, wherein the angular engagement between the spinning disc element and the header spinning disc is provided by the first keyed protrusion being inserted into the first opening in the header spinning disc.

23. The filter assembly of claim 18, wherein the filter head includes a first fluid flow port in fluid communication with the cavity in the base such that when the filter element is threadedly engaged with the filter spud and the first keyed projection is axially received into the first opening in the header spinning disc and in angular abutment with the first alignment rib, the first opening of the first keyed projection is in fluid communication with the fluid flow port of the filter head permitting fluid flow between the filter head and the filter element.

24. The filter assembly of claim 23, wherein the central threaded spud provides a second fluid port for the filter head, when the filter element is installed on the central threaded spud, the filterfilter media of the filter element is fluidly interposed between the first and second fluid ports.

25. The filter assembly of claim 18, wherein:
the base has a plurality of axially-projecting alignment ribs within the cavity arranged in a predetermined configuration, the plurality of axially projecting alignment ribs including the first alignment rib;
the plurality of axially-projecting alignment ribs being angularly spaced apart forming a gap therebetween, the gap being sized to receive the first keyed projection therein when the first opening in the header spinning disc is aligned with the gap.

* * * * *

UNITED STATES PATENT AND TRADEMARK OFFICE
CERTIFICATE OF CORRECTION

| | | |
|---|---|---|
| PATENT NO. | : 12,251,650 B2 | Page 1 of 1 |
| APPLICATION NO. | : 18/603389 | |
| DATED | : March 18, 2025 | |
| INVENTOR(S) | : Michael P. Vercammen et al. | |

It is certified that error appears in the above-identified patent and that said Letters Patent is hereby corrected as shown below:

In the Claims

Column 14, Claim 14, Line 39 currently reads "sion defining a first flow opening:" and should correctly read --sion defining a first flow opening;--

Column 14, Claim 15, Line 49 currently reads "A filter element. comprising:" and should correctly read --A filter element, comprising:--

Column 14, Claim 15, Line 60 currently reads "sion defining a first flow opening:" and should correctly read --sion defining a first flow opening;--

Column 14, Claim 15, Line 67 currently reads "plate into or out of the canister:" and should correctly read --plate into or out of the canister;--

Column 15, Claim 18, Line 33 currently reads "outer opening in the tap plate into or out of" and should correctly read --outer opening in the tap plate into or out of the canister; and--

Column 16, Claim 24, Line 47 currently reads "spud, the filterfilter media of the filter element is fluidly" and should correctly read --spud, the filter media of the filter element is fluidly--

Signed and Sealed this
Twenty-second Day of July, 2025

Coke Morgan Stewart
*Acting Director of the United States Patent and Trademark Office*